US011405807B2

(12) United States Patent
Takeda et al.

(10) Patent No.: US 11,405,807 B2
(45) Date of Patent: Aug. 2, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 154 days.

(21) Appl. No.: 16/763,747

(22) PCT Filed: Nov. 16, 2017

(86) PCT No.: PCT/JP2017/041343
§ 371 (c)(1),
(2) Date: May 13, 2020

(87) PCT Pub. No.: WO2019/097644
PCT Pub. Date: May 23, 2019

(65) Prior Publication Data
US 2020/0374722 A1    Nov. 26, 2020

(51) Int. Cl.
*H04W 72/04* (2009.01)
*H04W 24/08* (2009.01)

(52) U.S. Cl.
CPC ......... *H04W 24/08* (2013.01); *H04W 72/042* (2013.01); *H04W 72/0446* (2013.01); *H04W 72/0453* (2013.01); *H04W 72/0493* (2013.01)

(58) Field of Classification Search
CPC ............... H04W 24/08; H04W 72/042; H04W 72/0446; H04W 72/0453; H04W 72/0493
See application file for complete search history.

(56) References Cited

U.S. PATENT DOCUMENTS

| 9,860,896 B2 * | 1/2018 | Wu ........................ H04L 5/001 |
| 2016/0242203 A1 | 8/2016 | You et al. |
| 2016/0373229 A1 | 12/2016 | You et al. |

FOREIGN PATENT DOCUMENTS

EP    3706487 A1 *    9/2020    ............. H04L 5/001

OTHER PUBLICATIONS

3GPP TSG RAN WG1 Meeting #62; R1-104923 "Further Investigation on UE-Specific Search Space Design for Carrier Aggregation" NTT DOCOMO; Madrid, Spain; Aug. 23-27, 2010 (7 pages).

(Continued)

*Primary Examiner* — Melvin C Marcelo
(74) *Attorney, Agent, or Firm* — Osha Bergman Watanabe & Burton LLP

(57) ABSTRACT

A terminal is disclosed including a receiver that monitors physical downlink control channel (PDCCH) candidates within a control resource set (CORESET); and a processor that determines control resource element (CCE) indexes for a plurality of PDCCH candidates corresponding to an aggregation level and a carrier indicator field (CIF) value, wherein when a CIF for a serving cell that is monitored by the plurality of PDCCH candidates is not configured, the CIF value is 0, and an interval of starting CCE indexes of two neighboring PDCCH candidates of the plurality of PDCCH candidates is calculated by a value based on a number of the plurality of PDCCH candidates. In other aspects, a radio communication method for a terminal and a base station are also disclosed.

8 Claims, 9 Drawing Sheets

(56) References Cited

OTHER PUBLICATIONS

Extended European Search Report issued in European Application No. 17931904.1, dated May 26, 2021 (14 pages).
International Search Report issued in PCT/JP2017/041343 dated Jan. 30, 2018 (2 pages).
Written Opinion of the International Searching Authority issued in PCT/JP2017/041343 dated Jan. 30, 2018 (4 pages).
Huawei, HiSilicon; "CORESET configuration and search space design"; 3GPP TSG RAN WG1 Meeting #90bis, R1-1717062; Prague, Czech Republic; Oct. 9-13, 2017 (14 pages).
Samsung; "On Search Space Design"; 3GPP TSG RAN WG1 Meeting 90bis, R1-1717642; Prague, CZ; Oct. 9-13, 2017 (10 pages).
NTT DOCOMO, Inc.; "Search space design for NR-PDCCH"; 3GPP TSG RAN WG1 Meeting 90bis, R1-1718204; Nagoya, Japan; Sep. 18-21, 2017 (12 pages).
NTT DOCOMO, Inc.; "Summary of key aspects for search space"; 3GPP TSG RAN WG1 Meeting 90bis, R1-1718834; Prague, CZ; Oct. 9-13, 2017 (22 pages).
Samsung; "Search space design"; 3GPP TSG RAN WG1 #88bis, R1-1705380; Spokane, USA; Apr. 3-7, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Indian Application No. 202037024837 dated Apr. 20, 2022 (6 pages).

\* cited by examiner

USER TERMINAL AND RADIO COMMUNICATION METHOD

FIELD OF THE INVENTION

The present invention relates to a user terminal and a radio communication method in a next generation mobile communication system.

BACKGROUND OF THE INVENTION

In the universal mobile telecommunications system (UMTS) network, the long term evolution (LTE) has been specified to achieve a higher data rate, a lower delay, or the like (See Non-Patent Literature 1). In addition, the LTE-advanced (LTE-A, LTE Rel. 10, 11, or 12) has been specified to achieve a wider band and a higher speed than those of the LTE (LTE Rel. 8 or 9), and successor systems to the LTE (such as future radio access (FRA), 5th generation mobile communication system (5G), 5G+ (plus), new radio (NR), new radio access (NX), future generation radio access (FX), and LTE Rel. 13, 14, 15, or subsequent versions) are also discussed.

In the existing LTE systems (such as LTE Rel. 8 to 13), downlink (DL) and/or uplink (UL) communication is performed using a subframe of 1 ms (also referred to as "transmission time interval (TTI) or the like). This subframe is a transmission time unit of one channel-coded data packet and also serves as a processing unit of scheduling, link adaptation, retransmission control (HARQ: Hybrid Automatic Repeat request), or the like.

A radio base station controls allocation (scheduling) of data to the user terminal, and notifies data scheduling to the user terminal using downlink control information (DCI). The user terminal performs receiving processing (such as demodulation or decoding) by monitoring a downlink control channel (PDCCH: Physical Downlink Control Channel) where the downlink control information is transmitted, and controls receiving of the DL data and/or transmission of the uplink data on the basis of the received downlink control information.

In the downlink control channel (PDCCH/EPDCCH (Enhanced Physical Downlink Control Channel)), transmission is controlled using an aggregation of one or a plurality of control channel elements (CCE) or enhanced control channel elements (ECCE). In addition, each control channel element consists of a plurality of resource element groups (REG) or enhanced resource element groups (EREG). The resource element group is also used when the control channel is mapped to the resource element (RE).

CITATION LIST

Non-Patent Literatures

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF THE INVENTION

For future radio communication systems (such as LTE Rel. 14, 15, or subsequent versions, 5G, and NR), it is conceived that data scheduling is controlled using a configuration different from that of the existing LTE system (for example, LTE Rel. 13 or previous versions). Specifically, for the future radio communication systems, it is required to support flexible use of numerology and frequency and implement a dynamic frame configuration. The "numerology" refers to, for example, a communication parameter (such as a sub-carrier spacing and a bandwidth) applied to transmission or receiving of a certain signal.

For the future radio communication systems, it has been studied to use a configuration different from that of the existing LTE system for the control channel and/or the data channel. If the configuration of the downlink control channel of the existing LTE system is used in the configuration different from that of the existing LTE system, performance degradation such as communication equality degradation and/or throughput reduction may occur unfortunately.

In view of the aforementioned problems, it is an object of the present invention to provide a user terminal and a radio communication method, capable of suppressing system performance degradation even when communication is performed by applying a configuration of the downlink control channel different from that of the existing LTE system.

According to an aspect of the present invention, there is provided a user terminal including: a receiving section configured to receive a downlink control channel in a control resource set; and a control section configured to control determination of allocation having intervals based on a number or a maximum number of downlink control channel candidates for the downlink control channel candidates for a particular aggregation level in the control resource set.

According to the present invention, it is possible to suppress system performance degradation even when communication is performed by applying a configuration of the downlink control channel different from that of the existing LTE system.

DESCRIPTION OF EMBODIMENTS

Figure 1B:
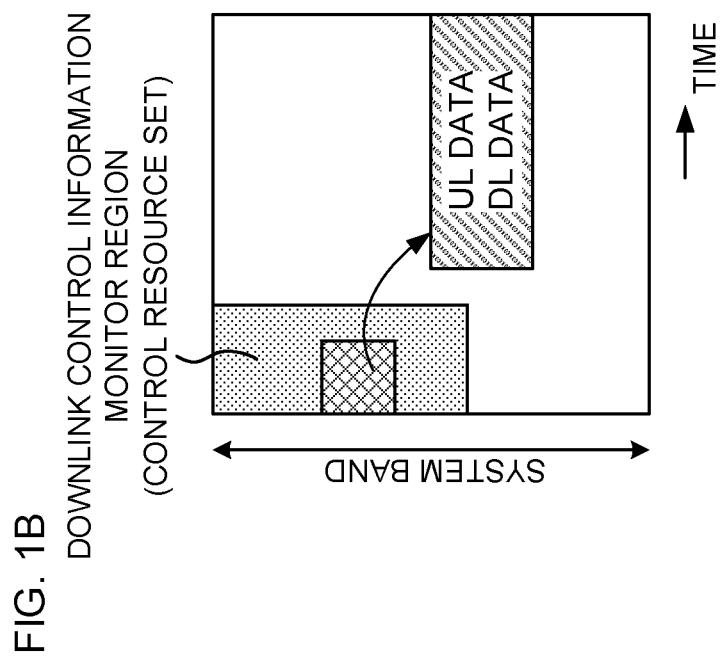
FIGS. 1A and 1B are diagrams illustrating exemplary downlink control channels in an existing LTE radio communication system and a future radio communication system.

In the existing LTE system, a radio base station transmits downlink control information (DCI) to a UE via a downlink control channel (such as a physical downlink control channel (PDCCH) and an enhanced PDCCH (EPDCCH)). "Transmitting downlink control information" may be read as "transmitting a downlink control channel".

The DCI may be scheduling information, for example, including at least one of information for designating a time/frequency resource to which data is to be scheduled, information for designating a transport block size, information for designating a data modulation scheme, information for designating a HARQ process identifier, information regarding demodulation RS, and the like. The DCI used to schedule DL data receiving and/or DL reference signal measurement may also be referred to as "DL assignment" or "DL grant", and the DCI used to schedule UL data transmission and/or UL sounding (measurement) signal transmission may also be referred to as "UL grant".

The DL assignment and/or the UL grant may contain information regarding a resource, a sequence, and a transmission format of the channel used to transmit a UL control signal (UCI: Uplink Control Information) such as HARQ-ACK feedback for the DL data or channel state information (CSI). In addition, the DCI used to schedule the UL control signal (UCI: Uplink Control Information) may be defined separately from the DL assignment and the UL grant. Which one of the DL assignment DCI, the UL grant DCI, and the UCI scheduling DCI may be determined on the basis of a value of a specific bit field included in the DCI, which of a plurality of given values the DCI payload size have, or which of the resource regions the DCI is detected, by assuming that each DCI is mapped to different resource regions in advance.

The UE is configured to monitor a given number of downlink control channel candidate sets. Here, "monitoring" refers to "decoding" of each downlink control channel for a target DCI format in this set. The "decoding" is also referred to as "blind decoding (BD)" or "blind detection". The "downlink control channel candidate" is also referred to as "BD candidate", "(E)PDCCH candidate", or the like.

The PDCCH candidate set to be monitored is also referred to as "search space". The radio base station allocates the DCI in a given PDCCH candidate included in the search space. The UE performs blind decoding for one or more candidate resources in the search space and detects the DCI for this UE. The search space may be configured by higher layer signaling common to the users or by higher layer signaling individual for the user. In addition, two or more search spaces may be configured using the same carrier for this user terminal.

In the existing LTE, a plurality of types of aggregation levels (AL) are defined for the search space in order to achieve link adaptation. The AL corresponds to the number of resource units included in the DCI (radio resources having a given duration and a given bandwidth, such as control channel elements (CCE) or enhanced control channel elements (ECCE)). The AL may also be referred to as "CCE aggregation level". In addition, the search space has a plurality of PDCCH candidates for a certain AL.

The DCI is attached with a cyclic redundancy check (CRC) bit. The CRC is masked (scrambled) by an identifier individual for the UE (such as cell-radio network temporary identifier (C-RNTI)) or an identifier common to the system. The UE may detect the DCI in which the CRC is scrambled with the C-RNTI corresponding to the host terminal and the DCI obtained in which the CRC is scrambled with the identifier common to the system.

The search space includes a common search space configured commonly to the UEs and a UE-specific search space configured for each UE. In the UE-specific search space of the PDCCH of the existing LTE, the AL (=number of CCEs) is 1, 2, 4, or 8. The number of PDCCH candidates is defined as "6, 6, 2, and 2" for "AL=1, 2, 4, and 8", respectively.

Figure 1A:
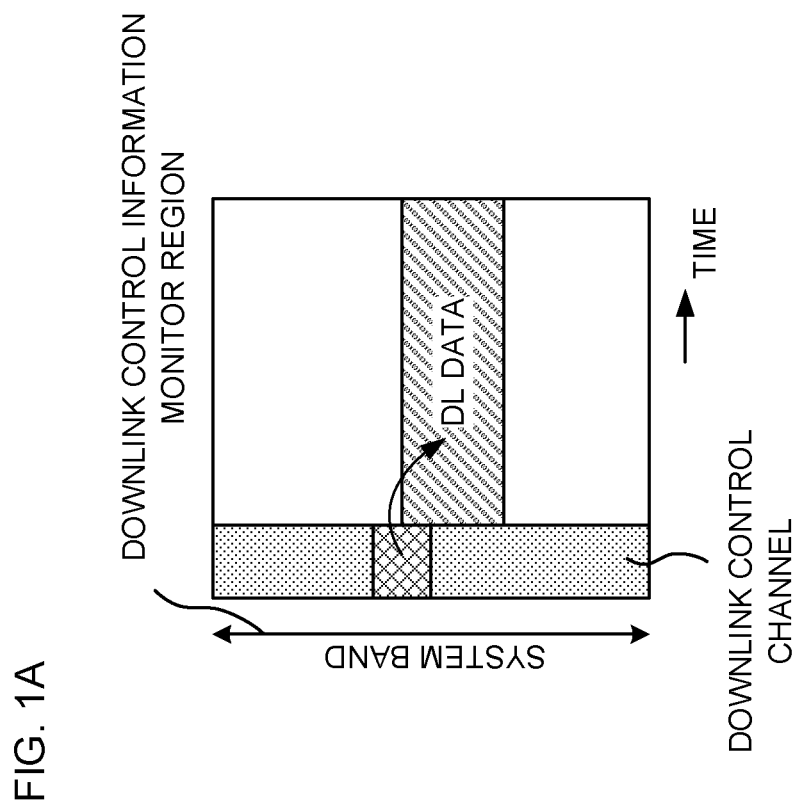

In the existing LTE system, the downlink control channel (or downlink control information) is transmitted using the entire system bandwidth (see FIG. 1A). For this reason, for each subframe, the UE was necessary to monitor the entire system bandwidth and receive the downlink control information (perform blind decoding) regardless of whether or not the DL data is allocated.

In comparison, in the future radio communication systems, since communication is not performed using the entire system band of a given carrier at all times, it is conceived that communication is controlled by dynamically or semi-statically setting a given frequency region (also referred to as "frequency band") on the basis of a communication purpose, a communication environment, and/or the like. For example, in the future radio communication systems, it is conceived that transmission of the downlink control information is controlled by configuring a given frequency region without allocating the downlink control information for a certain UE to the entire system band at all times (see FIG. 1B).

The control resource set (CORESET) is a frame (also referred to as "box", "set", or "block") of a time resource and/or a frequency resource that contains a resource to which the downlink control information is mapped or NR-PDCCH. In addition, the CORESET may be defined on the basis of a size of the resource unit. For example, a size of one CORESET may be configured to an integer multiple of a size of a particular resource unit. In addition, the CORESET may include continuous or discontinuous resource units.

The resource unit is a unit of the resource allocated to the NR-PDCCH. The resource unit may include any one of a resource block (RB) (such as a physical resource block (PRB) and/or a virtual resource block (VRB)), a PRB pair, NR-CCE, NR-REG, or an NR-REG group.

The CORESET may be configured within a bandwidth part (BWP) which is at least a part of the system bandwidth (carrier bandwidth) or the maximum bandwidth that can be received by the corresponding user terminal. The UE may control receiving by monitoring the downlink control information within a range of the CORESET. Using the CORESET, the UE is not necessary to monitor the entire system bandwidth at all times in the receiving processing of the downlink control information. Therefore, it is possible to save power consumption.

The UE may configured the CORESET using the CORESET configuration information (configuration) from the radio base station (via a network, eNB, gNB, or a transmission/reception point).

The radio base station is necessary to map the PDCCH candidate to the inside of the CORESET, and the UE is necessary to recognize allocation of the PDCCH candidate.

In the NR, it has been studied that a hash function for determining a position (resource such as starting CCE index) of the PDCCH candidate is based on a hash function for the LTE EPDCCH. In addition, it has been studied that the UE determines the search space set using the next parameter set.

AL set

Number of PDCCH candidates for each AL

PDCCH monitoring occasion for the search space set

However, a specific determination method for each PDCCH candidate position has not been determined. In this regard, the inventors achieved the present invention by studying the method of determining each PDCCH candidate position.

Embodiments of the present invention will now be described in details with reference to the accompanying drawings. The radio communication methods according to each embodiment may be applied solely or in combination.

First Aspect

According to the first aspect, starting CCE indices (also referred to as "minimum CCE index") of a plurality of PDCCH candidates for a given AL are allocated at equal intervals in the CORESET. That is, for a given AL, distances (intervals) between the starting CCE indices of two neighboring PDCCH candidates are equal.

In a given AL, the interval of the starting CCE index of the PDCCH candidate changes depending on the number of the PDCCH candidates ($M_x$).

Figure 2B:
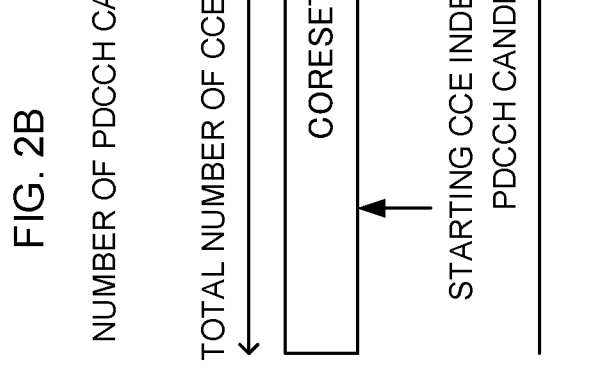
FIGS. 2A and 2B are diagrams illustrating exemplary allocation of PDCCH candidates in a CORESET according to a first aspect of the invention.
Figure 2A:
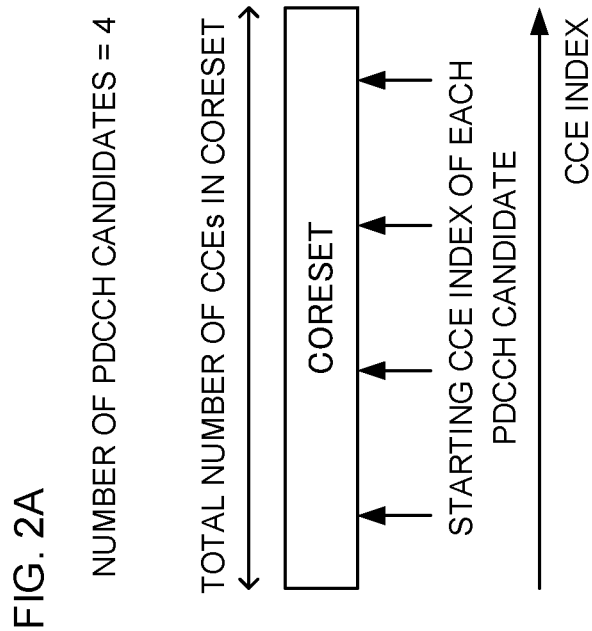

For example, as illustrated in FIG. 2A, if a total number of CCEs ($N_{CCE}$) in the CORESET is 100, and the number of PDCCH candidates ($M_x$) of the CORESET for a given AL is 2, the interval of the starting CCE index of the PDCCH candidate is obtained on the basis of a formula "$M_{CCE}/M_x$", which is 50. Assuming that the starting CCE index of the first PDCCH candidate is n, the starting CCE index of the second PDCCH candidate is "(n+50)mod100".

For example, as illustrated in FIG. 2B, if the number of PDCCH candidates ($M_x$) of the CORESET for a given AL is "4", the interval of the starting CCE index of the PDCCH candidate is obtained on the basis of a formula "$N_{CCE}/M_x$", which is "25". If the starting CCE index of the first PDCCH candidate is set n, the starting CCE indices of the second, third, and fourth PDCCH candidates are "(n+25)mod100", "(n+50)mod100", and "(n+75)mod100", respectively.

When the PDCCH candidate number is m (=0, 1, . . . , $M_x$−1), the starting CCE index of the PDCCH candidate m may be expressed as "(n+$N_{CCE}/M_x$×m)mod$N_{CCE}$". That is, the interval of the starting CCE index of the PDCCH candidate is inversely proportional to the number of PDCCH candidates ($M_x$). In this method, for a given AL, a plurality of PDCCH candidates can be allocated in the CORESET with equal intervals. In addition, the PDCCH candidates can be allocated across the entire CORESET regardless of the number of the PDCCH candidates.

Next, a specific method of determining allocation of the PDCCH candidate will be described.

The radio base station notifies the CORESET configuration information (configuration) to the UE, and the UE and the radio base station determine the PDCCH candidate position (starting CCE index) on the basis of the CORESET configuration information.

For each serving cell, the higher layer signaling (such as RRC signaling) configures "P" CORESETs for the UE. The CORESET number is p (0≤p<P). The CORESET configuration information may include at least one of an initial symbol index of the CORESET, the number of continuous symbols of the CORESET, the RB set, mapping from the CCE to the REG, an REG bundle size in the case of interleaving of mapping from the CCE to the REG, or a quasi-collocation of the antenna port.

For the UE, the CORESET set may be configured through the higher layer signaling in order to monitor the PDCCH. In addition, the UE may configured the number of PDCCH candidates for each aggregation level (CCE aggregation level) L, the PDCCH monitoring periodicity $k_p$ [slot], the PDCCH monitoring offset $o_p$ [slot] (0≤$o_p$<$k_p$), and a PDCCH monitoring pattern within one slot (for example, the initial symbol of the CORESET within a slot for the PDCCH monitoring) for each CORESET in the CORESET set through the higher layer signaling in order to monitor the PDCCH Each CORESET includes a set of CCEs numbered from 0 to "$N_{CCE, p, kp}$−1". Here, "$N_{CCE, p, kp}$" may be the number of CCEs in the CORESET p within the monitoring periodicity $k_p$. The "$N_{CCE, p, kp}$" may also be the $N_{CCE}$ described above.

The PDCCH UE-specific search space of the aggregation level L may be defined by the PDCCH candidate set for the aggregation level L. The aggregation level "L" may be one of "1, 2, 4, 8, and so on".

In the CORESET p, the CCE (starting CCE index) corresponding to the PDCCH candidate $m_{nCl}$ of the search space for a serving cell $n_{Cl}$ corresponding to the carrier indication field value may be given in Formula (1). The factor "$Y_{p, k}$" of Formula (1) may be given by Formula (2).

[Formula 1]

$$L \cdot \left\{ \left( Y_{p,k} + \left\lfloor \frac{m_{n_{Cl}} \cdot N_{CCE,p,k_p}}{L \cdot M_{p,max}^{(L)}} \right\rfloor + n_{Cl} \right) \bmod \lfloor N_{CCE,p,k_p} / L \rfloor \right\} + i \quad \text{Equation (1)}$$

$$Y_{p,k} = (A_p \cdot Y_{p,k_p-1}) \bmod D \quad \text{Equation (2)}$$

Here, a relationship "$Y_{p,-1}=n_{RNTI}\ne 0$" may be satisfied. For example, when "$k_p=0$", a relationship "$Y_{p, kp-1}=n_{RNTI}$" may be satisfied. Values may be "$A_0=39827$", "$A_1=39829$", "D=65537", and "i=0, . . . , L−1".

If a carrier indication field for a serving cell on which PDCCH is monitored is configured for the UE, the "$n_{Cl}$" may be a carrier indication field value. Otherwise, the "$n_{Cl}$" may be zero.

The "$N_{CCE, p, kp}$" may be the number of CCEs in the CORESET p at the PDCCH monitoring periodicity $k_p$.

The "$m_{nCl}$ (PDCCH candidate number)" is "0, . . . , $M^{(L)}_{pm\ nCl}$−1". Here, the "$M^{(L)}_{p, nCl}$" is the number of PDCCH candidates configured to be monitored by the UE for the aggregation level L for a serving cell corresponding to the "$n_{Cl}$". That is, the "$M^{(L)}_{p, nCl}$" may be "$M_x$".

The "$n_{RNTI}$" may be a radio network temporary ID (RNTI) value (such as an identifier individual for the UE).

The "$M^{(L)}_{p, max}$" may be "$M_x$". That is, the "$M^{(L)}_{p, max}$" may be the number of PDCCH candidates for the aggregation level L. In addition, the "$M^{(L)}_{p, max}$" may also be the "$M^{(L)}_{p, nCl}$".

The "$M^{(L)}_{p, max}$" may be configured by the higher layer signaling (such as "RRC signaling"). The "$M^{(L)}_{p, max}$" may be defined on the basis of the specification in association with a parameter such as the aggregation level L.

Each of the UE and the radio base station may determine positions of each PDCCH candidate using Formula (1). In this operation, it is possible to recognize the positions of each PDCCH candidates and allocate a plurality of PDCCH candidates at equal intervals. In this operation, since it is not necessary to notify the positions of each PDCCH candidate (starting CCE index), it is possible to suppress an overhead for notifying the positions of the PDCCH candidates. In addition, since the PDCCH candidates can be mapped to resources sufficiently separated from each other, it is possible to improve an effect of the frequency selective scheduling.

If the "$M^{(L)}_{p, max}$" is equal to the "$M^{(L)}_{p, nCl}$", it is possible to suppress the overhead for notification by suppressing the number of parameters to be notified.

Since the interval of the starting CCE index of the PDCCH candidate is based on the number of PDCCH candidates, it is possible to uniformly allocate the PDCCH candidates in the CORESET. In this allocation, it is possible to uniformize a possibility of blocking for a plurality of UEs (an event in which it is difficult to allocate the PDCCH candidate to the UE).

Second Aspect

In the second aspect, a total number of the PDCCH candidates (maximum number) for a given AL is fixed to a particular value $M_y$ in the CORESET. The starting CCE indices of a plurality of PDCCH candidates for a given AL have equal intervals in the CORESET. That is, distances (intervals) of the starting CCE index between two neighboring PDCCH candidates for a given AL are equal.

The intervals of the starting CCE indices of the PDCCH candidates for a given AL is determined on the basis of the maximum number My of the PDCCH candidates and are equal regardless of the number of PDCCH candidates $M_x$.

Figure 3B:
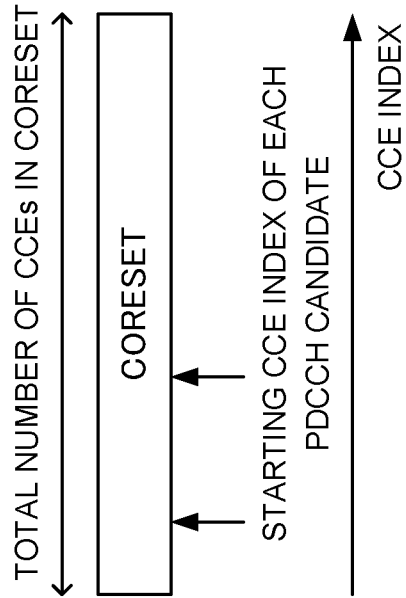
FIGS. 3A and 3B are diagrams illustrating exemplary allocation of PDCCH candidates in the CORESET according to a second aspect of the invention.
Figure 3A:
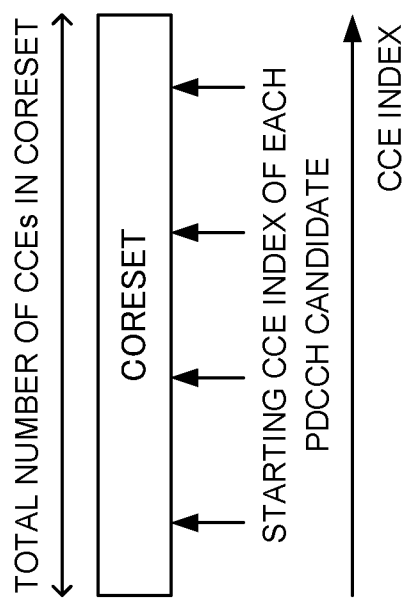

For example, as illustrated in FIG. 3A, assuming that a total number of CCEs ($N_{CCE}$) in the CORESET is 100, the maximum number of the PDCCH candidates ($M_y$) in the CORESET for a given AL is 4, and the number of PDCCH candidates ($M_x$) in the CORESET for a given AL is 2, the interval of the starting CCE index of the PDCCH candidate can be obtained from a formula "$N_{CCE}/M_y$", which becomes "25". If the starting CCE index of the first PDCCH candidate is n, the starting CCE index of the second PDCCH candidate is "(n+25)mod100".

For example, as illustrated in FIG. 3B, assuming that the number of PDCCH candidates ($M_x$) in the CORESET for a given AL is "4", the interval of the starting CCE index of the PDCCH candidate can be obtained from a formula "$N_{CCE}/M_y$", which becomes "25". If the starting CCE index of the first PDCCH candidate is n, the starting CCE indices of the second, third, and fourth PDCCH candidates become "(n+25)mod100", "(n+50)mod100", and "(n+75)mod100", respectively.

Assuming that the PDCCH candidate number is m (=0, 1, . . . , $M_x-1$), the starting CCE index of the PDCCH candidate "m" may be expressed as "(n+$N_{CCE}/M_y$×m) mod$N_{CCE}$". That is, the interval of the starting CCE index of the PDCCH candidate is inversely proportional to the maximum number of PDCCH candidates ($M_y$) without depending on the number of PDCCH candidates $M_x$. In this method, it is possible to allocate a plurality of PDCCH candidates in the CORESET for a given AL at equal intervals. In addition, if the number of PDCCH candidates is the maximum number, it is possible to allocate the PDCCH candidates across the entire CORESET.

Next, a specific method of determining the allocation of the PDCCH candidate will be described.

The starting CCE index (CCE) corresponding to the PDCCH candidate $m_{nCI}$ of the search space for the CORESET p and the serving cell $n_{CI}$ may be given by Formula (1) as described above. However, according to the second aspect, the analysis of the "$M^{(L)}_{p, max}$" in Formula (1) is different from the first aspect.

The "$M^{(L)}_{p, max}$" may be "$M_y$" as described above. That is, the "$M^{(L)}_{p, max}$" may be the maximum number of PDCCH candidates for the aggregation level L. For example, the "$M^{(L)}_{p, max}$" may be the maximum number of PDCCH candidates of all configured $n_{CI}$ values or configured DCI formats for the aggregation level L of the CORESET p.

The "$M^{(L)}_{p, max}$" may be defined depending on the specification or may be given by the system information (such as remaining minimum system information (RMSI)).

Each of the UE and the radio base station may determine the positions of each PDCCH candidate using Formula (1). In this operation, it is possible to recognize the positions of each PDCCH candidate and allocate a plurality of PDCCH candidates at equal intervals. In this operation, since it is not necessary to notify the positions of each PDCCH candidates (starting CCE index), it is possible to suppress the overhead for notifying the positions of the PDCCH candidates. In addition, since it is possible to fix the positions of PDCCH candidates regardless of the number of actually configured PDCCH candidates, it is possible to commonalize the terminal processing without depending on the configuration of the number of PDCCH candidates. Therefore, it is possible to reduce the processing circuit size.

Since the "$M^{(L)}_{p, max}$" is defined by the specification or is notified by the system information (such as broadcast information), it is not necessary to individually notify the "$M^{(L)}_{p, max}$" to the UE. Therefore, it is possible to suppress the overhead for notification.

(Radio Communication System)

A configuration of a radio communication system according to an embodiment of the invention will now be described. In this radio communication system, communication is performed using any one of the radio communication methods according to each embodiment of the invention or a combination thereof.

Figure 4:
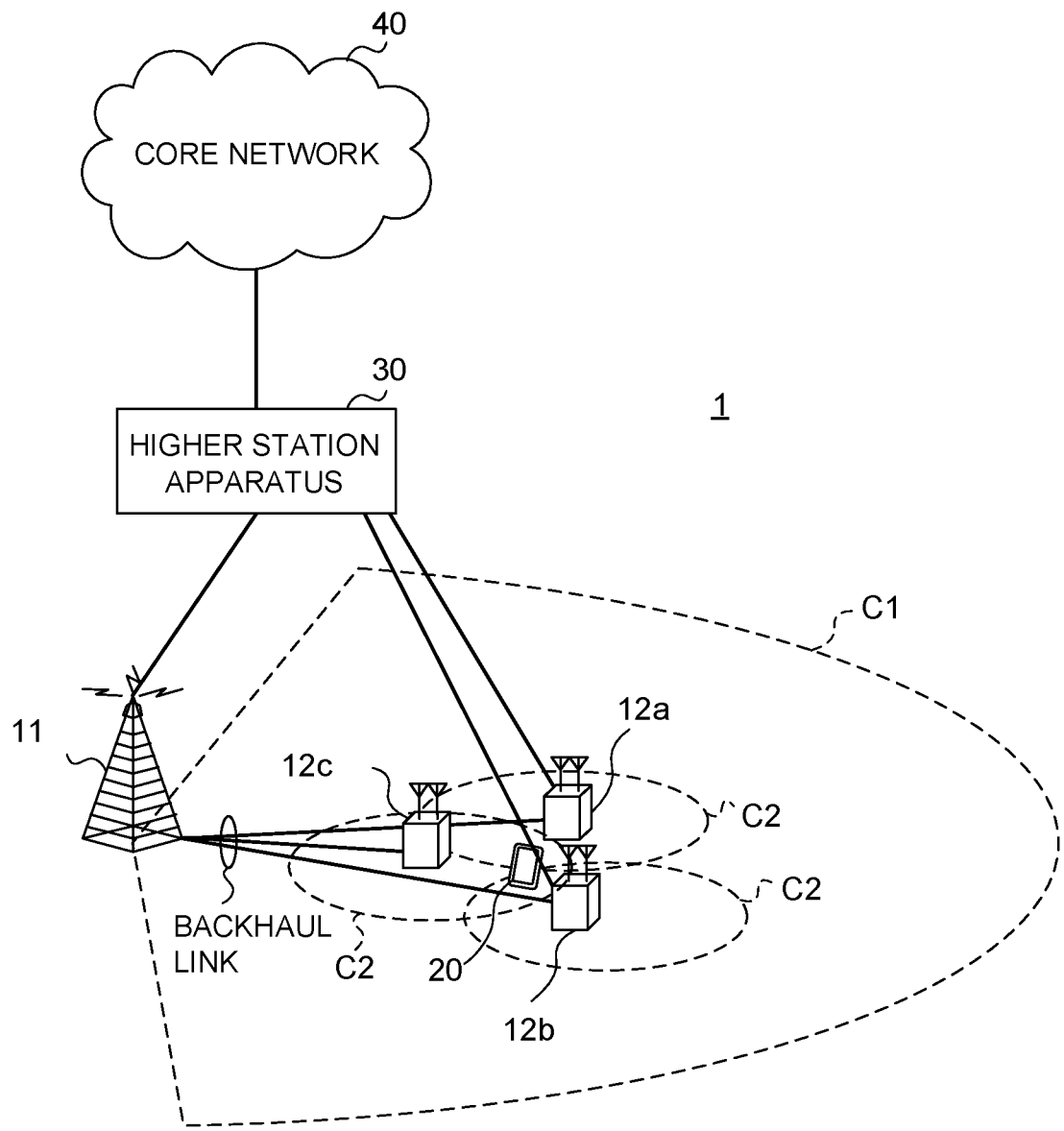
FIG. 4 is a diagram illustrating an exemplary schematic configuration of a radio communication system according to an embodiment of the invention.

FIG. 4 is a diagram illustrating an exemplary schematic configuration of the radio communication system according to an embodiment of the invention. In the radio communication system 1, carrier aggregation (CA) and/or dual connectivity (DC) is applicable, in which a plurality of fundamental frequency blocks (component carriers) are integrated by using a system bandwidth (for example, 20 MHz) of the LTE system as one unit.

Note that the radio communication system 1 may be referred to as LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology), or the like, or may also be referred to as a system that implements those technologies.

The radio communication system 1 has a radio base station 11 that forms a macro cell C1 having a relatively wider coverage and radio base stations 12 (12a to 12c) arranged in the macro cell C1 to form a small cell C2 having a coverage narrower than the macro cell C1. In addition, the user terminal 20 is arranged in the macro cell Cl and each small cell C2. The arrangement, the number, and the like of each cell and the user terminal 20 are not limited to those illustrated in the drawings.

The user terminal 20 is connectable to both the radio base stations 11 and 12. It is assumed that the user terminal 20 is used in both the macro cell C1 and the small cell C2 at the same time using the CA or DC technology. In addition, the user terminal 20 may apply the CA or DC technology using a plurality of cells CC (for example, five CCs or smaller or six CCs or larger).

Between the user terminal 20 and the radio base station 11, communication can be performed using a narrow bandwidth carrier (also referred to as an existing carrier or a legacy carrier) at a relatively low frequency band (for example, 2 GHz). Meanwhile, between the user terminal 20 and the radio base station 12, a wide bandwidth carrier may be used at a relatively higher frequency band (such as 3.5 GHz or 5 GHz), or a carrier similar to that used for communication with the radio base station 11 may also be used. Note that the configuration of the frequency band used by each radio base station is not limited thereto.

Between the radio base stations 11 and 12 (or between two radio base stations 12), wired connection (such as fiber optics based on common public radio interface (CPRI) or X2 interface) or wireless connection may be established.

Each of the radio base stations 11 and 12 is connected to an higher layer station apparatus 30, and is connected to a core network 40 via the higher station apparatus 30. Note that the higher station apparatus 30 may include, for example, an access gateway apparatus, a radio network controller (RNC), a mobility management entity (MME), or the like, but not limited thereto. In addition, each radio base station 12 may be connected to the higher station apparatus 30 via the radio base station 11.

Note that the radio base station 11 is a radio base station having a relatively wide coverage, and may also be referred to as "macro base station", "integrated node", "eNB (eNodeB)", "transmission/reception point", or the like. In addition, the radio base station 12 is a radio base station having a local coverage, and may also be referred to as "small base station", "micro base station", "pico base station", "femto base station", "Home eNodeB (HeNB)", "remote radio head (RRH)", "transmission/reception point", or the like. Unless distinguished separately, the radio base stations 11 and 12 will be collectively referred to as "radio base station 10".

Each user terminal 20 is a terminal conformable to various communication types such as LTE or LTE-A, and may also include a fixed communication terminal (fixed station) as well as a mobile communication terminal (mobile station).

As the radio access scheme of the radio communication system 1, orthogonal frequency division multiple access (OFDMA) is applied to the downlink, and single carrier frequency division multiple access (SC-FDMA) and/or OFDMA is applied to the uplink.

The OFDMA is a multi-carrier transmission scheme for performing communication by dividing a frequency band into a plurality of narrow frequency bands (subcarriers) and mapping data to each subcarrier. The SC-FDMA is a single carrier transmission scheme to reduce interference between terminals by dividing, per terminal, the system bandwidth into bands formed with one or continuous resource blocks and allowing a plurality of terminals to use different bands. Note that the uplink and downlink radio access schemes are not limited to such a combination, and other radio access schemes may also be employed.

As the downlink channel of the radio communication system 1, a downlink shared channel (PDSCH: Physical Downlink Shared Channel) that is used by each user terminal 20 on a shared basis, a broadcast channel (PBCH: Physical Broadcast channel), and a downlink L1/L2 control channel, or the like are employed. The PDSCH is used to transmit user data, higher layer control information, a system information block (SIB), and the like. In addition, the PBCH is used to transmit a master information block (MIB).

The downlink L1/L2 control channel includes a physical downlink control channel (PDCCH), an enhanced physical downlink control channel (EPDCCH), a physical control format indicator channel (PCFICH), and a physical hybrid-ARQ indicator channel (PHICH), or the like. The PDCCH is used to transmit downlink control information (DCI), including PDSCH and/or PUSCH scheduling information, or the like.

Note that the DCI may be used to notify scheduling information. For example, the DCI used to schedule the DL data receiving may also be referred to as "DL assignment", and the DCI used to schedule the UL data transmission may also be referred to as "UL grant".

The PCFICH is used to transmit the number of OFDM symbols used in the PDCCH. The PHICH is used to transmit hybrid automatic repeat request (HARQ) transmission acknowledgment information for the PUSCH (for example, also referred to as "retransmission control information", "HARQ-ACK", "ACK/NACK", or the like). The EPDCCH is frequency-division-multiplexed with a downlink shared data channel (PDSCH) and is used for transmitting the DCI or the like, similar to the PDCCH.

As the uplink channel of the radio communication system 1, an uplink shared channel (PUSCH: Physical Uplink Shared Channel) that is used by each user terminal 20 on a shared basis, an uplink control channel (PUCCH: Physical Uplink Control Channel), a random access channel (PRACH: Physical Random Access Channel), or the like is employed. The PUSCH is used to transmit user data, higher layer control information, and the like. In addition, the PUCCH is used to transmit radio quality information (CQI: Channel Quality Indicator), transmission acknowledgment information, scheduling request (SR), and the like of the downlink. The PRACH is used to transmit a random access preamble for establishing connection to a cell.

As the downlink reference signal of the radio communication system 1, a cell specific reference signal (CRS), a channel state information reference signal (CSI-RS), a demodulation reference signal (DMRS), a positioning reference signal (PRS), or the like is transmitted. In addition, as the uplink reference signal of the radio communication system 1, a sounding reference signal (SRS), a demodulation reference signal (DMRS), or the like is transmitted. Note that the DMRS may also be referred to as "UE-specific reference signal". Furthermore, the transmitted reference signals are not limited thereto.

<Radio Base Station>

Figure 5:
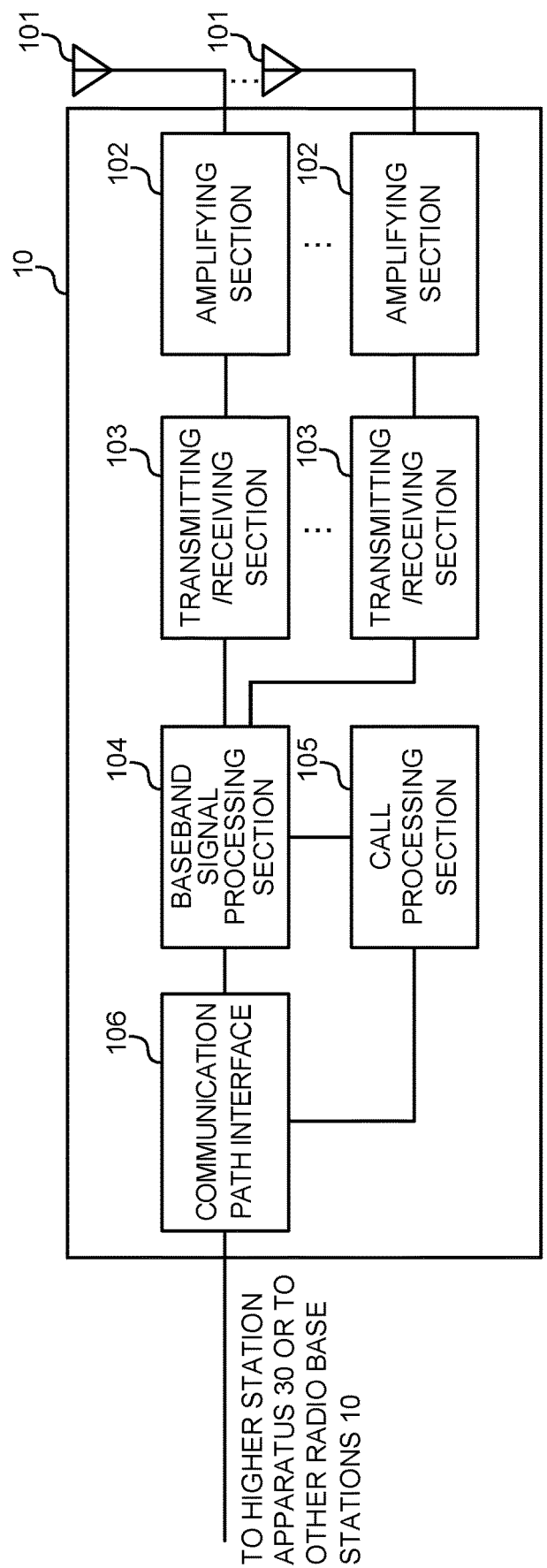
FIG. 5 is a diagram illustrating an exemplary complete configuration of a radio base station according to an embodiment of the invention.

FIG. 5 is a diagram illustrating a complete configuration of the radio base station according to an embodiment of the invention. The radio base station 10 includes a plurality of transmitting/receiving antennas 101, an amplifying section 102, a transmitting/receiving section 103, a baseband signal processing section 104, a call processing section 105, and a transmission path interface 106. Note that one or more transmitting/receiving antennas 101, one or more amplifying sections 102, and one or more transmitting/receiving sections 103 may be provided.

User data transmitted on the downlink from the radio base station 10 to the user terminal 20 is input from the higher station apparatus 30 to the baseband signal processing section 104 via the transmission path interface 106.

In the baseband signal processing section 104, the user data is subjected to transmission processing such as packet data convergence protocol (PDCP) layer processing, dividing/combining of user data, radio link control (RLC) layer transmission processing such as RLC retransmission control, medium access control (MAC) retransmission control (such as HARQ transmission processing), scheduling, transport format selection, channel coding, inverse fast Fourier transform (IFFT) processing, and precoding processing, and a resultant signal is transmitted to the transmitting/receiving section 103. In addition, the downlink control signal is also subjected to transmission processing such as channel coding and inverse fast Fourier transform, and a resultant signal is also transmitted to the transmitting/receiving section 103.

The transmitting/receiving section 103 converts the baseband signal precoded per each antenna and output from the baseband signal processing section 104 into a radio frequency band and transmits the radio frequency band. The radio frequency signal subjected to frequency conversion in the transmitting/receiving section 103 is amplified by the amplifying section 102 and is transmitted from the transmitting/receiving antenna 101. The transmitting/receiving section 103 may include a transmitter/receiver, a transmitting/receiving circuit, or a transmitting/receiving apparatus as explained on the basis of common knowledge in the technical field to which the present invention pertains. Note that the transmitting/receiving section 103 may include an integrated transmitting/receiving section or may separately include a transmitting section and a receiving section.

Meanwhile, for the uplink signal, a radio frequency signal received by the transmitting/receiving antenna 101 is amplified by the amplifying section 102. The transmitting/receiving section 103 receives the uplink signal amplified by the amplifying section 102. The transmitting/receiving section 103 frequency-converts the received signal into a baseband signal and outputs the baseband signal to the baseband signal processing section 104.

The baseband signal processing section 104 performs fast Fourier transform (FFT) processing, inverse discrete Fourier transform (IDFT) processing, error correction decoding, MAC retransmission control receiving processing, and RLC layer and PDCP layer receiving processing for the user data included in the input uplink signal and transmits the resultant signal to the higher station apparatus 30 via the transmission path interface 106. The call processing section 105 performs call processing (such as call set-up and releasing) for a communication channel, state management of the radio base station 10, management of the radio resources, and the like.

The transmission path interface 106 transmits or receives signals to/from the higher station apparatus 30 via a given interface. In addition, the transmission path interface 106 may transmit or receives signals (backhaul signaling) to/from other radio base stations 10 via an inter-base-station interface (such as optical fiber or X2 interface compliant with the common public radio interface (CPRI)).

The transmitting/receiving section 103 may transmit a downlink control channel (such as PDCCH) via the control resource set.

Figure 6:
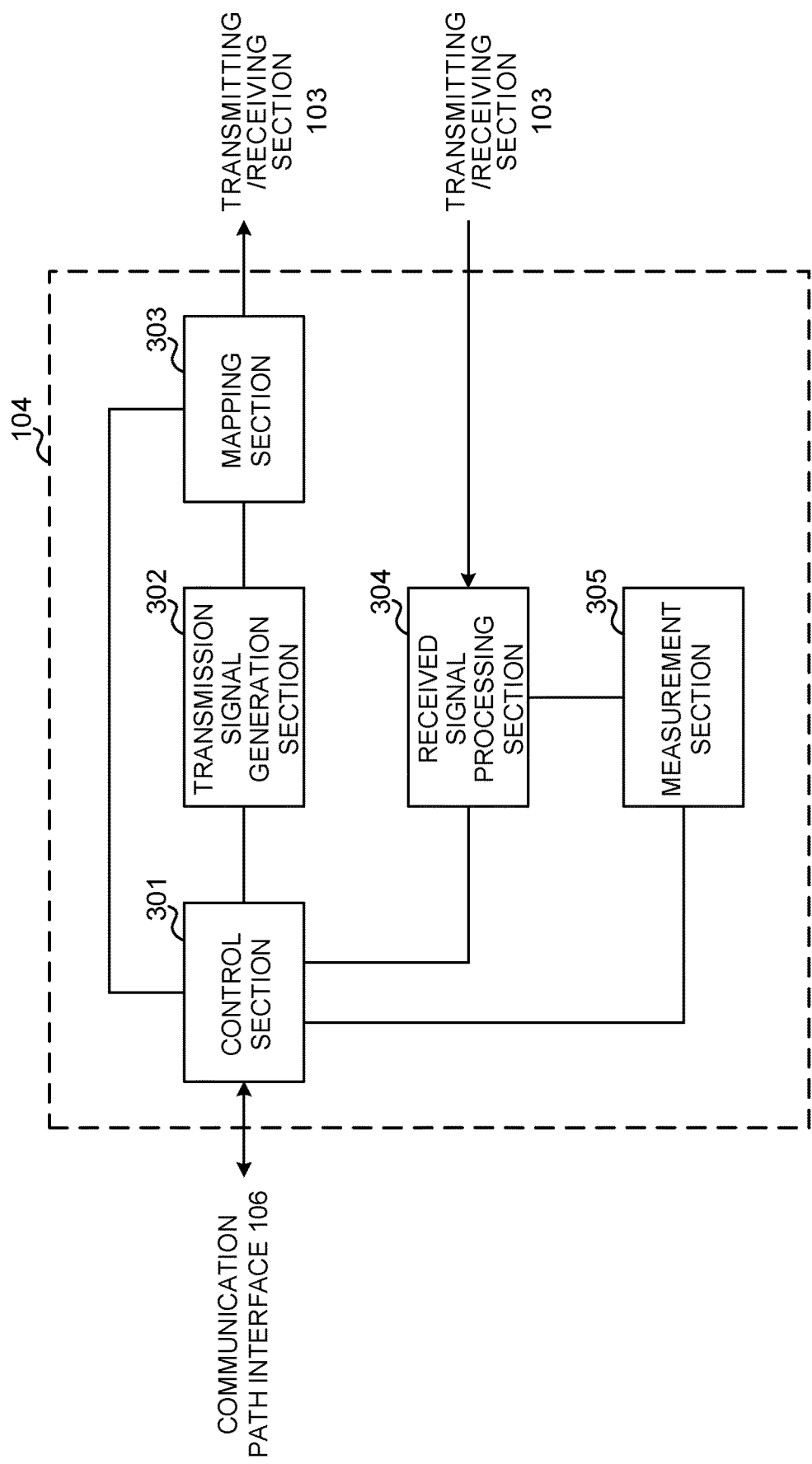
FIG. 6 is a diagram illustrating an exemplary functional configuration of the radio base station according to an embodiment of the invention.

FIG. 6 is a diagram illustrating an exemplary functional configuration of the radio base station according to an embodiment of the invention. Note that, although functional blocks of characteristic parts of this embodiment are mainly illustrated in this example, the radio base station 10 may include other functional blocks necessary for radio communication.

The baseband signal processing section 104 at least includes a control section (scheduler) 301, a transmitting signal generating section 302, a mapping section 303, a receiving signal processing section 304, and a measurement section 305. Note that a part or all of such components may not be included in the baseband signal processing section 104 as long as they are included in the radio base station 10.

The control section (scheduler) 301 controls the radio base station 10 as a whole. The control section 301 may include a controller, a control circuit, or a control apparatus as explained on the basis of common knowledge in the technical field to which the present invention pertains.

The control section 301 controls, for example, generation of signals using the transmitting signal generating section 302, allocation of signals using the mapping section 303, and the like. In addition, the control section 301 controls signal receiving processing of the receiving signal processing section 304, measurement of signals using the measurement section 305, and the like.

The control section 301 controls scheduling (such as resource allocation) of system information, a downlink data signal (such as a signal transmitted via PDSCH) and a downlink control signal (such as a signal transmitted via PDCCH and/or EPDCCH or transmission acknowledgment information). In addition, the control section 301 controls generation of a downlink control signal, a downlink data signal, and the like on the basis of a result of determination on whether or not retransmission control is necessary for the uplink data signal or the like. Furthermore, the control section 301 controls scheduling of a synchronization signal (such as PSS/SSS (Primary Synchronization Signal/Secondary Synchronization Signal)), the downlink reference signal (such as CRS, CSI-RS, and DMRS), and the like.

The control section 301 controls scheduling of an uplink data signal (such as a signal transmitted via PUSCH), an uplink control signal (such as a signal transmitted via PUCCH and/or PUSCH or transmission acknowledgment information), a random access preamble (such as a signal transmitted via PRACH), an uplink reference signal, and the like.

The transmitting signal generating section 302 generates a downlink signal (such as a downlink control signal, a downlink data signal, and a downlink reference signal) on the basis of an instruction from the control section 301 and outputs the downlink signal to the mapping section 303. The transmitting signal generating section 302 may include a signal generator, a signal generating circuit, or a signal generating apparatus as explained on the basis of common knowledge in the technical field to which the present invention pertains.

The transmitting signal generating section 302 generates DL assignment for notifying downlink data allocation information and/or UL grant for notifying uplink data allocation information, for example, on the basis of an instruction from the control section 301. Both the DL assignment and the UL grant are DCIs compliant with the DCI format. In addition, the downlink data signal is subjected to coding processing and modulation processing depending on a coding rate, a modulation scheme, and the like determined on the basis of channel state information (CSI) or the like from each user terminal 20.

The mapping section 303 maps a downlink signal generated by the transmitting signal generating section 302 to a given radio resource on the basis of an instruction from the control section 301 and outputs it to the transmitting/receiving section 103. The mapping section 303 may include a mapper, a mapping circuit, or a mapping apparatus as explained on the basis of common knowledge in the technical field to which the present invention pertains.

The receiving signal processing section 304 performs receiving processing (such as de-mapping, demodulation, and decoding) for the receiving signal input from the transmitting/receiving section 103. Here, the receiving signal includes an uplink signal (such as an uplink control signal, an uplink data signal, and an uplink reference signal) transmitted from the user terminal 20. The receiving signal processing section 304 may include a signal processor, a signal processing circuit, or a signal processing apparatus as explained on the basis of common knowledge in the technical field to which the present invention pertains.

The receiving signal processing section 304 outputs the information decoded through the receiving processing to the control section 301. For example, when the PUCCH including the HARQ-ACK is received, the HARQ-ACK is output to the control section 301. In addition, the receiving signal processing section 304 outputs the received signal and/or the signal subjected to the receiving processing to the measurement section 305.

The measurement section 305 performs measurement for the received signal. The measurement section 305 may include a measurement meter, a measurement circuit, or a measurement apparatus as explained on the basis of common knowledge in the technical field to which the present invention pertains.

For example, the measurement section 305 may perform radio resource management (RRM) measurement, channel state information (CSI) measurement, or the like on the basis of the received signal. The measurement section 305 may measure received power (such as reference signal received power (RSRP)), received quality (such as a reference signal received quality (RSRQ) and a signal to interference plus noise ratio (SINR)), a signal intensity (such as received signal strength indicator (RSSI)), transmission path information (such as CSI), or the like. The measurement result may be output to the control section 301.

The control section 301 may determine allocation having an interval based on the number or the maximum number of the downlink control channel candidates for the downlink control channel candidates (such as the PDCCH candidates) for a particular aggregation level in the control resource set.

<User Terminal>

Figure 7:
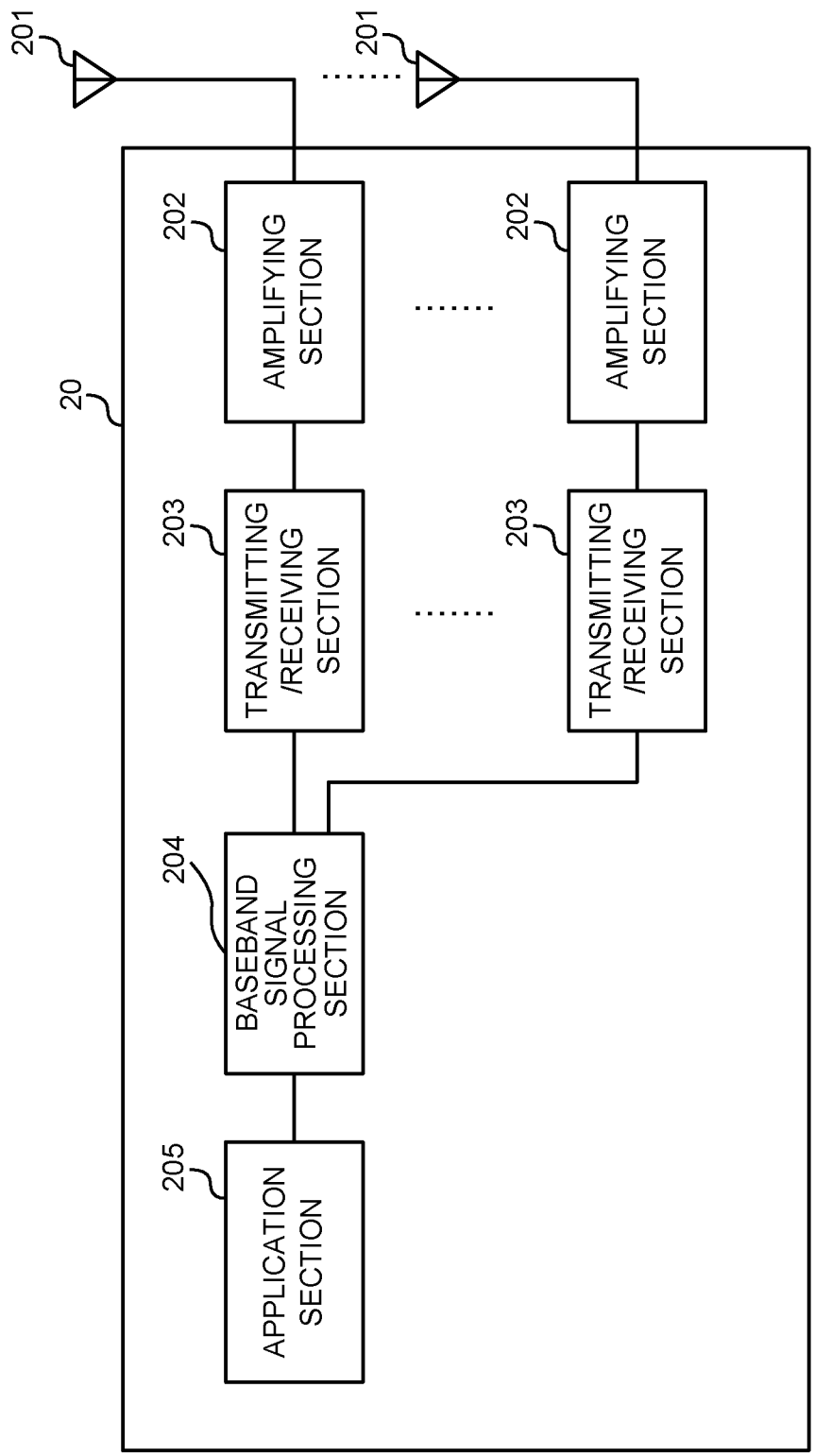
FIG. 7 is a diagram illustrating an exemplary complete configuration of a user terminal according to an embodiment of the invention.

FIG. 7 is a diagram illustrating an exemplary complete configuration of the user terminal according to an embodiment of the invention. The user terminal 20 includes a plurality of transmitting/receiving antennas 201, an amplifying section 202, a transmitting/receiving section 203, a baseband signal processing section 204, and an application section 205. Note that one or more transmitting/receiving antennas 201, one or more amplifying sections 202, and one or more transmitting/receiving sections 203 may be provided.

A radio frequency signal received via the transmitting/receiving antenna 201 is amplified by the amplifying section 202. The transmitting/receiving section 203 receives the downlink signal amplified by the amplifying section 202. The transmitting/receiving section 203 frequency-converts the received signal into a baseband signal and outputs the baseband signal to the baseband signal processing section 204. The transmitting/receiving section 203 may include a transmitter/receiver, a transmitting/receiving circuit, or a transmitting/receiving apparatus as explained on the basis of common knowledge in the technical field to which the present invention pertains. Note that the transmitting/receiving section 203 may include an integrated transmitting/receiving section or may separately include a transmitting section and a receiving section.

The baseband signal processing section 204 performs receiving processing such as FFT processing, error correction decoding, retransmission control for the input baseband signal, or the like. The downlink user data is transmitted to the application section 205. The application section 205 performs processing for layers higher than the physical layer and the MAC layer, and the like. In addition, out of the downlink data, the broadcast information may be transmitted to the application section 205.

Meanwhile, the uplink user data is input from the application section 205 to the baseband signal processing section 204. The baseband signal processing section 204 performs transmission processing of the retransmission control (such as HARQ transmission processing), channel coding, precoding, discrete Fourier transform (DFT) processing, IFFT processing, or the like and transmits the resultant signal to the transmitting/receiving section 203. The transmitting/receiving section 203 converts the baseband signal output from the baseband signal processing section 204 into a radio frequency band and transmits the radio frequency signal. The radio frequency signal converted by the transmitting/receiving section 203 is amplified by the amplifying section 202 and is transmitted from the transmitting/receiving antenna 201.

The transmitting/receiving section 203 may receive a downlink control channel (such as PDCCH) for the control resource set.

Figure 8:
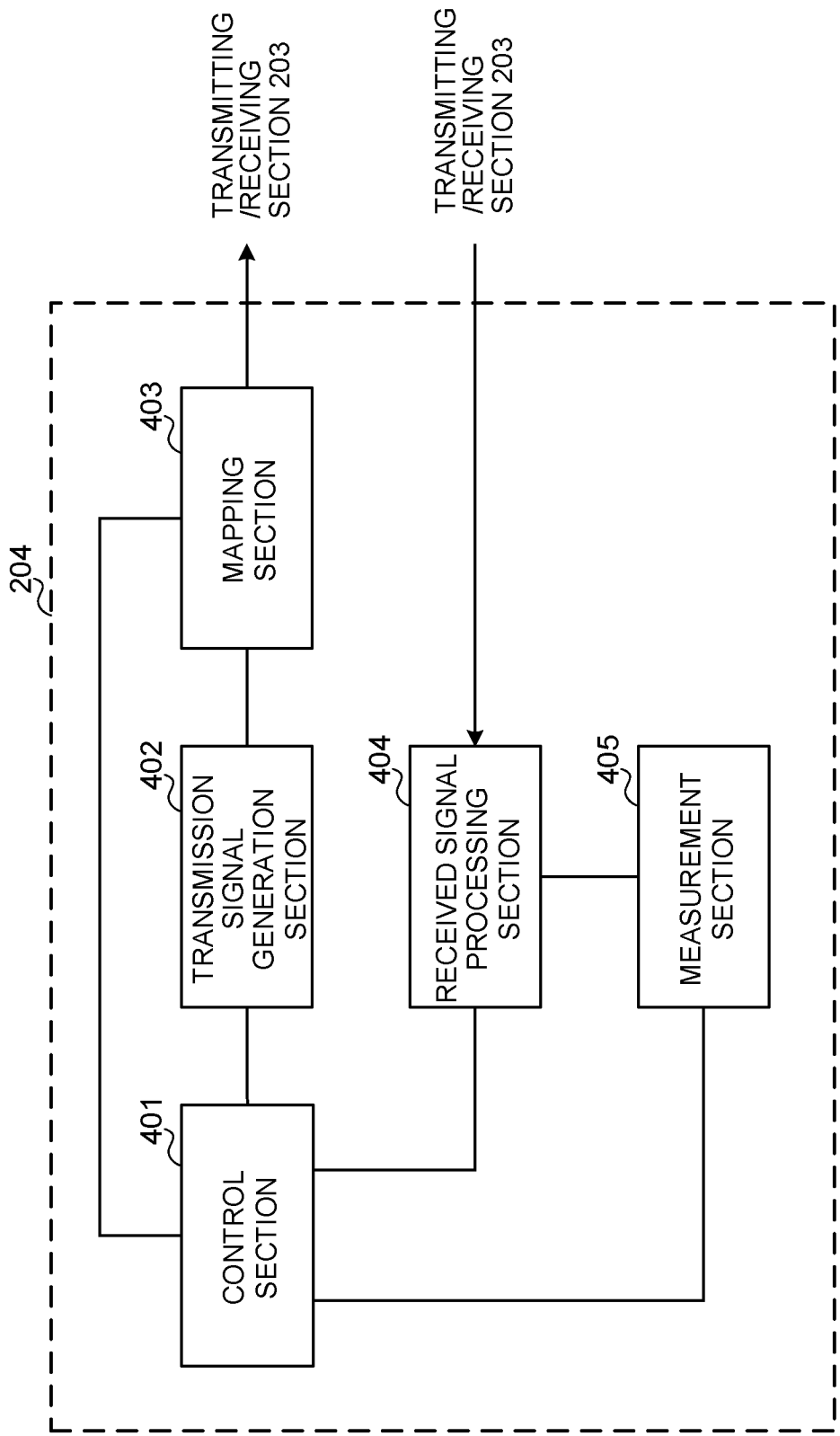
FIG. 8 is a diagram illustrating an exemplary functional configuration of the user terminal according to an embodiment of the invention.

FIG. 8 is a diagram illustrating an exemplary functional configuration of the user terminal according to an embodiment of the invention. Note that, although functional blocks of characteristic parts according to this embodiment are mainly illustrated, the user terminal 20 may include other functional blocks necessary for radio communication.

The baseband signal processing section 204 of the user terminal 20 at least includes a control section 401, a transmitting signal generating section 402, a mapping section 403, a receiving signal processing section 404, and a measurement section 405. Note that a part or all of such components may not be included in the baseband signal processing section 204 as long as they are included in the user terminal 20.

The control section 401 controls the user terminal 20 as a whole. The control section 401 may include a controller, a control circuit, or a control apparatus as explained on the basis of common knowledge in the technical field to which the present invention pertains.

The control section 401 controls, for example, generation of signals using the transmitting signal generating section 402, allocation of signals using the mapping section 403, and the like. In addition, the control section 401 controls signal receiving processing of the receiving signal processing section 404, measurement of signals using the measurement section 405, and the like.

The control section 401 acquires the downlink control signal and the downlink data signal transmitted from the radio base station 10 from the receiving signal processing section 404. The control section 401 controls generation of the uplink control signal and/or the uplink data signal on the basis of a determination result on whether or not retransmission control is necessary for the downlink control signal and/or the downlink data signal, or the like.

When various pieces of information notified from the radio base station 10 are acquired from the receiving signal processing section 404, the control section 401 may update a parameter used in the control on the basis of such information.

The transmitting signal generating section 402 generates an uplink signal (such as an uplink control signal, an uplink data signal, and an uplink reference signal) on the basis of an instruction from the control section 401 and outputs the uplink signal to the mapping section 403. The transmitting signal generating section 402 may include a signal generator, a signal generating circuit, or a signal generating apparatus as explained on the basis of common knowledge in the technical field to which the present invention pertains.

The transmitting signal generating section 402 generates the uplink control signal regarding transmission acknowledgment information, channel state information (CSI), or the like, for example, on the basis of an instruction from the control section 401. In addition, the transmitting signal generating section 402 generates the uplink data signal on the basis of an instruction from the control section 401. For example, the transmitting signal generating section 402 is instructed of the uplink data signal generation from the control section 401 when the downlink control signal notified from the radio base station 10 includes the UL grant.

The mapping section 403 maps the uplink signal generated by the transmitting signal generating section 402 to a radio resource on the basis of the instruction from the control section 401 and outputs it to the transmitting/receiving section 203. The mapping section 403 may include a mapper, a mapping circuit, or a mapping apparatus as explained on the basis of common knowledge in the technical field to which the present invention pertains.

The receiving signal processing section 404 performs receiving processing (such as de-mapping, demodulation, and decoding) for the receiving signal input from the transmitting/receiving section 203. Here, the receiving signal includes a downlink signal (such as a downlink control signal, a downlink data signal, and a downlink reference signal) transmitted from the radio base station 10. The receiving signal processing section 404 may include a signal processor, a signal processing circuit, or a signal processing apparatus as explained on the basis of common knowledge in the technical field to which the present invention pertains. In addition, the receiving signal processing section 404 may be configured as a receiving section according to the present invention.

The receiving signal processing section 404 outputs the information decoded through the receiving processing to the control section 401. The receiving signal processing section 404 outputs, for example, broadcast information, system information, RRC signaling, DCI, or the like to the control section 401. In addition, the receiving signal processing section 404 outputs the received signal and/or the signal subjected to the receiving processing to the measurement section 405.

The measurement section 405 performs measurement for the received signal. The measurement section 405 may include a measurement meter, a measurement circuit, or a measurement apparatus as explained on the basis of common knowledge in the technical field to which the present invention pertains.

For example, the measurement section 405 may perform RRM measurement, CSI measurement, or the like on the basis of the received signal. The measurement section 405 may measure received power (such as RSRP), received quality (such as RSRQ and SINR), a signal intensity (such as RSSI), transmission path information (such as CSI), or the like. The measurement result may be output to the control section 401.

The control section 401 may determine allocation having an interval based on the number or the maximum number of the downlink control channel candidates for the downlink control channel candidates (such as PDCCH candidates) for a particular aggregation level in the control resource set.

The interval may be inversely proportional to the number of the downlink control channel candidates. In addition, the number of the downlink control channel candidates may be given by the higher layer signaling (such as RRC signaling) (first embodiment).

The interval may be inversely proportional to the maximum number of the downlink control channel candidates. In addition, the maximum number of the downlink control channel candidates may be defined on the basis of the specification or the system information (such as RMSI) (second embodiment).

<Hardware Configuration>

Note that the block diagrams used in description of the aforementioned embodiments illustrate blocks in the unit of function. Such functional blocks (components) are implemented by arbitrarily combining hardware and/or software. In addition, the method of implementing each functional block is not particularly limited. That is, each functional block may be implemented using a single apparatus combined physically and/or logically or using a plurality of apparatuses by directly and/or indirectly connecting two or more apparatuses physically and/or logically separated (for example, in a wired and/or wireless manner).

Figure 9:
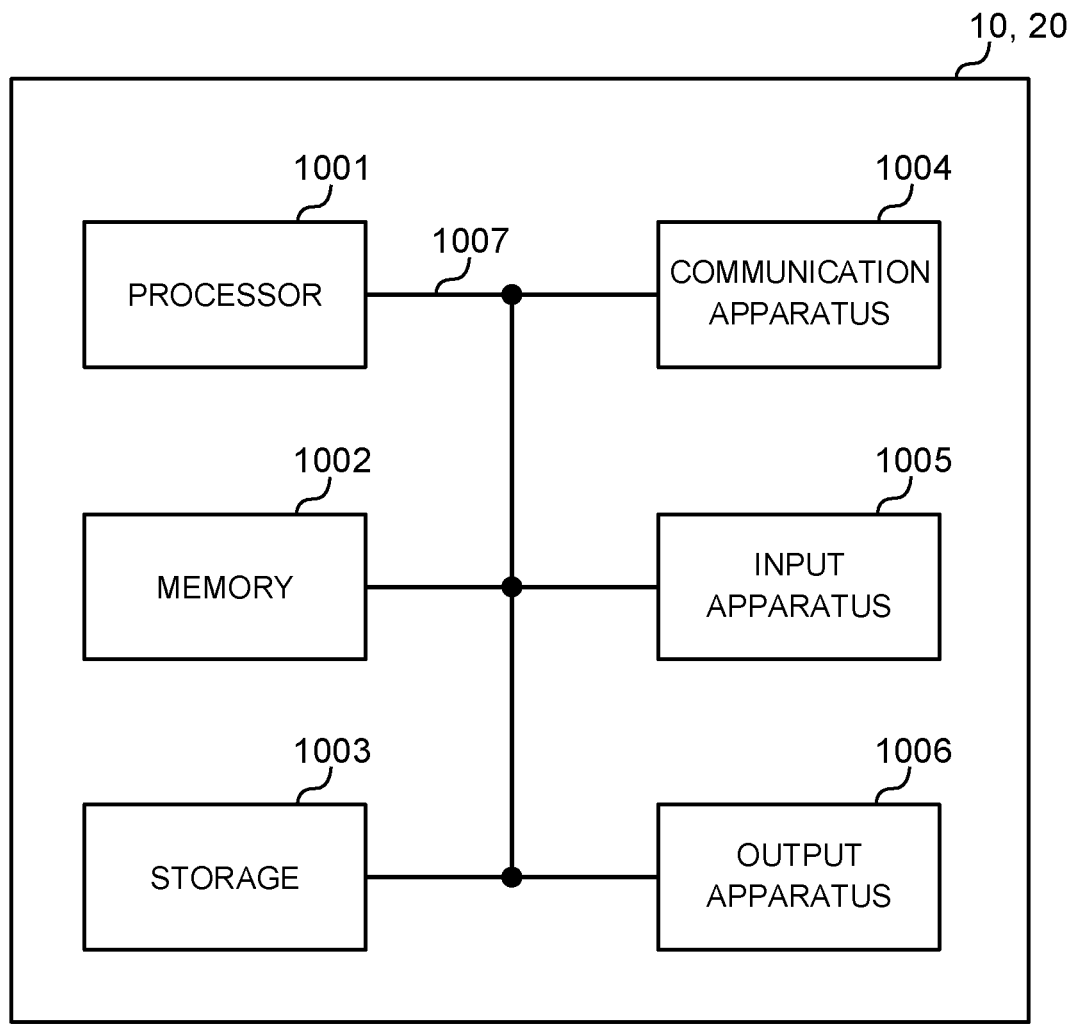
FIG. 9 is a diagram illustrating exemplary hardware configurations of the radio base station and the user terminal according to an embodiment of the invention.

For example, the radio base station and the user terminal according to an embodiment of the present invention may function as a computer that performs processing of the radio communication method of the present invention. FIG. 9 is a diagram illustrating exemplary hardware configurations of the radio base station and the user terminal according to an embodiment of the present invention. The aforementioned radio base station 10 and the user terminal 20 may physically include a computer apparatus having a processor 1001, a memory 1002, a storage 1003, a communication apparatus 1004, an input apparatus 1005, an output apparatus 1006, a bus 1007, or the like.

Note that, in the following description, the word "apparatus" may be replaced with "circuit", "device", "unit", or the like. The hardware configurations of the radio base station 10 and the user terminal 20 may include one or a plurality of apparatuses illustrated in the drawings or may not include a part of the apparatuses.

For example, although only one processor 1001 is illustrated, a plurality of processors may also be provided. In addition, the processing may be executed by a single processor or may be executed by one or more processors simultaneously, sequentially, or using other methods. Note that the processor 1001 may be embedded in one or more chips.

Each function of the radio base station 10 and the user terminal 20 is implemented by reading given software (program) to hardware of the processor 1001, the memory 1002, or the like, performing operation using the processor 1001, and controlling communication via the communication apparatus 1004 and data reading and/or writing of the memory 1002 and storage 1003.

For example, the processor 1001 controls the computer as a whole by operating an operating system. The processor 1001 may also include a central processing unit (CPU) having an interface with a peripheral device, a control apparatus, an operating apparatus, a register, and the like. For example, the aforementioned baseband signal processing section 104 (204), the call processing section 105, or the like may be implemented by the processor 1001.

The processor 1001 reads programs (program codes), software module, data, or the like from the storage 1003 and/or the communication apparatus 1004 to the memory 1002 and uses them as a basis to execute various processings. The program causes a computer to execute at least a part of the operations described in the aforementioned embodiments. For example, the control section 401 of the user terminal 20 may be implemented by a control program stored in the memory 1002 and operated in the processor 1001, or may be implemented by other functional blocks in a similar manner.

The memory 1002 is a computer readable recoding medium, and, for example, may include at least one of a read only memory (ROM), an erasable programmable ROM (EPROM), an electrically EPROM (EEPROM), a random access memory (RAM), or other suitable storage media. The memory 1002 may also be referred to as "register", "cache", "main memory (main storage device)", or the like. The memory 1002 may store programs (program codes), software modules, and the like to implement the radio communication method according to an embodiment of the invention.

The storage 1003 is a computer readable recording medium and may include at least one of a flexible disc, a floppy (registered trademark) disc, a magnetic optical disk (such as compact disc ROM (CD-ROM), a digital multipurpose disc, and a Blu-ray (registered trademark) disc), a removable disc, a hard disk drive, a smart card, a flash memory device (such as a card, a stick, and a key drive), a magnetic stripe, a database, a server, or other suitable storage media. The storage 1003 may also be referred to as "auxiliary storage device".

The communication apparatus 1004 is hardware (transmitting/receiving device) for performing communication between computers via wire and/or wireless networks and may also be referred to as "network device", "network controller", "network card", "communication module", or the like. The communication apparatus 1004 may also include a high-frequency switch, a duplexer, a filter, a frequency synthesizer, or the like in order to implement, for example, frequency division duplex (FDD) and/or time division duplex (TDD) communication. For example, the transmitting/receiving antenna 101 (or 201), the amplifying section 102 (or 202), the transmitting/receiving section 103 (or 203), the transmission path interface 106, and the like described above may be implemented by the communication apparatus 1004.

The input apparatus 1005 is an input device that receives an input from the outside (such as a keyboard, a mouse, a microphone, a switch, a button, and a sensor). The output apparatus 1006 is an output device (such as a display, a speaker, and a light emitting diode (LED) lamp) for outputting information to the outside. Note that the input apparatus 1005 and the output apparatus 1006 may be integrated with each other (for example, a touch panel).

Various apparatuses such as the processor 1001 and the memory 1002 are connected via a bus 1007 for information communication. The bus 1007 may include a single bus, or different buses may be used for each apparatus.

The radio base station 10 and the user terminal 20 may include hardware such as a micro processor, a digital signal processor (DSP), an application specific integrated circuit (ASIC), a programmable logic device (PLD), and a field programmable gate array (FPGA). In addition, the hardware may be used to implement a part or all of the functional blocks. For example, the processor 1001 may be embedded with at least one of such hardware units.

Modifications

Note that technical terminologies discussed herein and/or technical terminologies necessary for understanding this specification may be substituted with other technical terminologies having the same or similar meanings. For example, channels and/or symbols may be substituted with signals (signaling). Furthermore, signals may be substituted with messages. In addition, the reference signal may be abbreviated to "RS", and may also be referred to as "pilot", "pilot signal", or the like depending on the applied standard. Furthermore, the component carrier (CC) may also be referred to as "cell", "frequency carrier", "carrier frequency", or the like.

The radio frame may include one or a plurality of periods (frames) in the time domain. The one or a plurality of periods (frames) of the radio frame may also be referred to as "subframe". In addition, the subframe may include one or a plurality of slots in the time domain. Furthermore, the subframe may have a fixed time length (for example, 1 ms) regardless of the numerology.

The slot may include one or a plurality of symbols (such as orthogonal frequency division multiplexing (OFDM) symbols or single carrier frequency division multiple access (SC-FDMA) symbols) in the time domain. In addition, the slot may be a time unit based on the numerology. Furthermore, the slot may include a plurality of mini-slots. Each mini-slot may include one or a plurality of symbols in the time domain. Moreover, the mini-slot may also be referred to as "sub-slot".

All of the radio frame, the subframe, the slot, the mini-slot, and the symbol represent a time unit for signal transmission. Each of the radio frame, the subframe, the slot, the mini-slot, and the symbol may be called different names. For example, one subframe may be referred to as "transmission time interval (TTI)", or a plurality of continuous subframes may be referred to as "TTI". In addition, one slot or one mini-slot may be referred to as "TTI". That is, the subframe and/or the TTI may be a subframe (1 ms) in the existing LTE, may be shorter than 1 ms (for example, 1 to 13 symbols), or may be longer than 1 ms. Note that the unit of the TTI may also be referred to as "slot", "mini-slot", or the like instead of the subframe.

Here, the TTI refers to a minimum time unit for scheduling in radio communication. For example, in the LTE system, the scheduling is performed such that the radio base station allocates radio resources (such as a frequency bandwidth and a transmission power available for each user terminal) to each user terminal on a TTI basis. The definition of "TTI" is not limited thereto.

The TTI may be a transmission time unit of channel-coded data packets (transport blocks), code blocks, and/or codewords or may be a processing unit of scheduling, link adaptation, or the like. Note that, when the TTI is given, a time interval (for example, the number of symbols) during which transport blocks, code blocks, and/or codewords are mapped in practice may be shorter than the TTI.

Note that, when one slot or one mini-slot is referred to as the "TTI", one or more TTIs (that is, one or more slots or one or more mini-slots) may be the minimum time unit of the scheduling. In addition, the number of the slots (mini-slots) included in the minimum time unit of the scheduling may also be controlled.

The TTI having a time length of "1 ms" may also be referred to as "typical TTI (TTI of LTE Rel. 8 to 12), "normal TTI", "long TTI", "typical subframe", "normal subframe", "long subframe", or the like. The TTI shorter than the typical TTI may also be referred to as "reduced TTI", "short TTI", "partial TTI", "fractional TTI", "reduced subframe", "short subframe", "mini-slot", "sub-slot", or the like.

Note that the long TTI (such as the typical TTI or subframe) may also be referred to as "TTI having a time length exceeding 1 ms", and the short TTI (such as the reduced TTI) may also be referred to as "TTI having a TTI length shorter than that of the long TTI and having a TTI length of 1 ms or longer".

The resource block (RB) is a resource allocation unit in the time domain and the frequency domain and may include one or a plurality of continuous subcarriers in the frequency domain. In addition, the RB may include one or a plurality of symbols in the time domain and may be one slot, one mini-slot, one subframe, or one TTI length. One TTI and one subframe may include one or a plurality of resource blocks. The one or the plurality of RBs may also be referred to as "physical resource block (PRB)", "sub-carrier group (SCG)", "resource element group (REG)", "PRB pair", "RB pair", or the like.

The resource block may include one or a plurality of resource elements (REs). For example, one RE may include a radio resource region for one subcarrier and one symbol.

The structures of the radio frame, the subframe, the slot, the mini-slot, the symbol, and the like described above are merely given by way of example. For example, the number of subframes included in a radio frame, the number of slots included in a subframe or radio frame, the number of mini-slots included in a slot, the numbers of symbols and RBs included in a slot or mini-slot, the number of subcarriers included in an RB, the number of symbols in a TTI, a symbol length, a cyclic prefix (CP) length, and the like may change variously.

The information, parameters, or the like discussed herein may be expressed as absolute values or as relative values with respect to a given value, or may be expressed as other corresponding information. For example, the radio resource may be indicated by a given index.

The names used for parameters herein are not to be construed as a limitative sense. For example, since all of various channels (such as the physical uplink control channel (PUCCH) and the physical downlink control channel (PDCCH)) and information factors can be identified using suitable names, various names designated to various channels and information factors are not to be construed as a limitative sense in any point.

Information, signals, or the like discussed herein may be expressed as any one of various different technologies. For example, data, instructions, commands, information, signals, bits, symbols, chips, or the like described throughout the aforementioned description may be expressed as voltages, currents, electromagnetic waves, magnetic fields or magnetic particles, optical fields or photons, or any combination thereof.

Information, signals, or the like may be output from the higher layer to the lower layer and/or from the lower layer to the higher layer. Information, signals, or the like may be input/output via a plurality of network nodes.

The input/output information, signals, or the like may be stored in a particular place (such as a memory) or may be managed using a management table. The input/output information, signals, or the like may be overwritten, updated, or added. The information, signals, or the like that have been output may be deleted. The input information, signals, or the like may be transmitted to other apparatuses.

Notification of information may be performed using other methods without limiting to the aspects/embodiments described herein. For example, notification of information may be performed using physical layer signaling (such as downlink control information (DCI) and uplink control information (UCI)), higher layer signaling (such as radio resource control (RRC) signaling, broadcast information (such as master information block (MIB) and system information block (SIB)), medium access control (MAC) signaling), other signals, or any combination thereof.

Note that the physical layer signaling may also be referred to as "L1/L2 (Layer 1/Layer 2) control information (L1/L2 control signal)", "L1 control information (L1 control signal)", or the like. In addition, the RRC signaling may also be referred to as "RRC message", for example, "RRC connection setup message", "RRC connection reconfiguration message", or the like. Furthermore, the MAC signaling may be notified, for example, using a MAC control element (MAC CE).

Notification of given information (for example, notification of "X") may be performed implicitly (for example, without performing notification of the given information or by notifying other information) without limiting to explicit notification.

The determination may be performed using a value expressed in one bit ("0" or "1"), may be performed using a Boolean value expressed in "true" or "false", or may be performed by comparing numerical values (for example, comparison with a given value).

It is natural to widely interpret "software" to include an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the software is referred to as software, firmware, middleware, microcode, hardware description language, or other names.

Software, instructions, information, or the like may be transmitted or received via a transmission medium. For example, when the software is transmitted from a website, server, or another remote source in a wired manner (such as a coaxial cable, a fiber optic cable, a twisted pair, and a digital subscriber line (DSL)) and/or in wireless manner (such as infrared and a microwave), these wired and/or wireless technologies are also incorporated into the definition of the transmission medium.

The words "system" and "network" as used herein are interchangeable.

Herein, the words "base station (BS)", "radio base station", "eNB", "gNB", "cell", "sector", "cell group", "carrier", and "component carrier" may be interchangeable. In some cases, the "base station" is also referred to as "fixed station", "NodeB", "eNodeB (eNB)", "access point", "transmitting point", "receiving point", "femto cell", "small cell", or the like.

A base station may accommodate one or more (for example, three) cells (also referred to as "sectors"). If the base station accommodates a plurality of cells, the whole coverage area of the base station may be segmented into multiple smaller areas, and the respective smaller areas may provide communication services with a base station subsystem (for example, an indoor small base station (RRH: Remote Radio Head)). The word "cell" or "sector" refers to a part or whole of the coverage area of the base station and/or the base station subsystem providing communication services in this coverage.

Herein, the words "mobile station (MS)", "user terminal", "user equipment (UE)", and "terminal" may be interchangeable. The "base station" may also be referred to as "fixed station", "NodeB", "eNodeB (eNB)", "access point", "transmitting point", "receiving point", "femto cell", "small cell", and the like.

In some cases, the "mobile station" may be referred to, by those skilled in the art, as "subscriber station", "mobile unit", "subscriber unit", "wireless unit", "remote unit", "mobile device", "wireless device", "wireless communication device", "remote device", "mobile subscriber station", "access terminal", "mobile terminal", "wireless terminal", "remote terminal", "handset", "user agent", "mobile client", "client", or any other appropriate terminologies.

The radio base station herein may also be referred to as "user terminal". For example, the aforementioned aspects/ embodiments may be applied to a case where communication between the radio base station and the user terminal is substituted with communication between a plurality of user terminals (D2D: Device-to-Device). In this case, the aforementioned functions provided in the radio base station 10 may be included in the configuration of the user terminal 20. In addition, the words "uplink" and "downlink" may also be referred to as "sides". For example, the uplink channel may also be referred to as "side channel".

Similarly, the "user terminal" herein may also be referred to as "radio base station". In this case, the aforementioned functions provided in the user terminal 20 may be included in the radio base station 10.

The operations performed by the base station as described herein may be performed by its higher node in some cases. In a network including one or a plurality of network nodes having base stations, it is apparent that various operations performed to communicate with a terminal may be performed by a base station, one or more network nodes other than the base station (such as "mobility management entity (MME)" or "serving-gateway (S-GW)", but not limited thereto), or a combination thereof.

Each of the aspects/embodiments described herein may be used solely, in combination, or switchably upon execution. In addition, the processing procedures, sequences, flow-charts, and the like of the aspects/embodiments described herein may be executed in different orders as long as consistency can be ensured. For example, the method described herein presents elements of various steps in an exemplary order without limiting to a specific order.

Each of the aspects/embodiments as described herein is applicable to a systems based on LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), a system based on any other suitable radio communication method, and/or a next-generation system enhanced on the basis of them.

The phrase "based on ~" (or "on the basis of ~") as used herein does not signify "only based on" unless specified otherwise. In other words, the phrase "based on" signifies both "only based on" and "at least based on".

Any reference to elements using terminologies such as "first", "second", and so on as used herein does not limit the amount or order of these elements in general. These terminologies can be used herein in convenient manners for distinguishing between two or more elements. Accordingly, the reference to the first and second elements does not mean that only the two elements are used, or the first element is to precede the second element in any fashion.

In some cases, the word "determine or decide (determining)" as used herein may include various types of operations. For example, "determining or deciding" may be regarded as "determining or deciding" of calculating, computing, processing, deriving, investigating, looking up (such as search in a table, a database, or another data structure), or ascertaining. In addition, "determining or deciding" may be regarded as "determining or deciding" in receiving (such as receiving of information), transmitting (such as transmitting of information), input, output, accessing (such as accessing to data in a memory), or the like. Furthermore, "determining or deciding" may be regarded as "determining or deciding" in resolving, selecting, choosing, establishing, comparing, or the like. That is, "determining or deciding" may be regarded as "determining or deciding" of some operation.

The word "connected or coupled" or any variation thereof as used herein means all possible direct or indirect connections or coupling between two or more elements and may include existence of one or more intermediate elements between two elements mutually "connected" or "coupled". The coupling or connection between elements may be physical, logical, or in combination thereof. For example, the word "connection" may be replaced with "access".

As used herein, two elements may be regarded as being mutually "connected" or "coupled" using one or more electric wires, cables, and/or print electric interconnections, and as several non-limiting and non-comprehensive examples, using electromagnetic energy having a wavelength of a radio frequency domain, a microwave domain, and/or an optical (both visible and invisible) domain, or the like.

As used herein, the phrase "A and B are different" may mean "A and B are different from each other". Such an interpretation may also apply to the words "separated", "combined", and the like.

In a case where the word "including", "comprising" or any variation thereof is used in this specification or claims, such a word is intended to be "inclusive" as in the word "have". Furthermore, the word "or" as used in this specification or claims is intended not to mean "exclusive OR".

While the present invention has been described in details hereinbefore, it is apparent to those skilled in the art that the invention is not limited to the embodiments described herein. Various modifications and changes may be possible without departing from the spirit and scope of the present invention as defined in claims. Accordingly, the description is given only for illustrative purposes and is by no means intended to limit the present invention.

The invention claimed is:

1. A terminal comprising:
   a receiver that monitors physical downlink control channel (PDCCH) candidates within a control resource set (CORESET); and
   a processor that determines control resource element (CCE) indexes for a plurality of PDCCH candidates corresponding to an aggregation level and a carrier indicator field (CIF) value,
   wherein when a CIF for a serving cell that is monitored by the plurality of PDCCH candidates is not configured, the CIF value is 0,
   an interval between starting CCE indexes of any two neighboring PDCCH candidates of the plurality of PDCCH candidates is the number of CCEs in the CORESET divided by a value,
   the value is a maximum of numbers of candidates in the plurality of PDCCH candidates, and
   the numbers of candidates correspond to the CIF values respectively.

2. The terminal according to claim 1, wherein the CCE indexes correspond to the plurality of PDCCH candidates of a search space for the serving cell corresponding to the CIF value.

3. The terminal according to claim 1, wherein the interval is inversely proportional to the value.

4. The terminal according to claim 1, wherein the plurality of PDCCH candidates are included in a search space that is specific to the terminal.

5. The terminal according to claim 2, wherein the interval is inversely proportional to the value.

6. A radio communication method for a terminal comprising:
receiving physical downlink control channel (PDCCH) candidates within a control resource set (CORESET); and
determining control resource element (CCE) indexes for a plurality of PDCCH candidates corresponding to an aggregation level and a carrier indicator field (CIF) value,
wherein when a CIF for a serving cell that is monitored by the plurality of PDCCH candidates is not configured, the CIF value is 0,
an interval between starting CCE indexes of any two neighboring PDCCH candidates of the plurality of PDCCH candidates is the number of CCEs in the CORESET divided by a value,
the value is a maximum of numbers of candidates in the plurality of PDCCH candidates, and
the numbers of candidates correspond to the CIF values respectively.

7. A base station comprising:
a transmitter that transmits physical downlink control channel (PDCCH) candidates within a control resource set (CORESET); and
a processor that determines control resource element (CCE) indexes for a plurality of PDCCH candidates corresponding to an aggregation level and a carrier indicator field (CIF) value,
wherein when a CIF for a serving cell that is monitored by the plurality of PDCCH candidates is not configured, the CIF value is 0,
an interval between starting CCE indexes of any two neighboring PDCCH candidates of the plurality of PDCCH candidates is the number of CCEs in the CORESET divided by a value,
the value is a maximum of numbers of candidates in the plurality of PDCCH candidates, and
the numbers of candidates correspond to the CIF values respectively.

8. A system comprising:
a terminal that comprises:
a receiver that monitors physical downlink control channel (PDCCH) candidates within a control resource set (CORESET); and
a processor that determines control resource element (CCE) indexes for a plurality of PDCCH candidates corresponding to an aggregation level and a carrier indicator field (CIF) value; and
a base station that transmits the PDCCH within the CORESET,
wherein when a CIF for a serving cell that is monitored by the plurality of PDCCH candidates is not configured, the CIF value is 0,
an interval between starting CCE indexes of any two neighboring PDCCH candidates of the plurality of PDCCH candidates is the number of CCEs in the CORESET divided by a value,
the value is a maximum of numbers of candidates in the plurality of PDCCH candidates, and
the numbers of candidates correspond to the CIF values respectively.

* * * * *